Nov. 25, 1958  J. F. RINGELMAN ET AL  2,862,197
AMPLITUDE DISCRIMINATOR
Filed Oct. 7, 1955

WITNESSES
Edwin C. Bassler
J. N. Murray

INVENTORS
Gordon E. Lynn &
John F. Ringelman
BY E. Browder
ATTORNEY

United States Patent Office 2,862,197
Patented Nov. 25, 1958

2,862,197

AMPLITUDE DISCRIMINATOR

John F. Ringelman, Catonsville, and Gordon E. Lynn, Severna Park, Md., assignors to Westinghouse Electric Corporation, East Pittsburgh, Pa., a corporation of Pennsylvania Application October 7, 1955, Serial No. 539,139

10 Claims. (Cl. 340—172)

This invention relates to apparatus for producing an average output voltage which is proportional to the average voltage amplitude of one of a plurality of input signals, and more particularly to a device of the type described which employs saturable inductive core members to achieve amplitude discrimination.

It is an object of this invention to provide a novel amplitude discriminator circuit which is characterized in that out of a plurality of input signals an output signal is derived having an average voltage value proportional to the average voltage amplitude of the largest input signal. As will become apparent from the following detailed description, the circuit employs a saturable magnetic core member which is driven between conditions of saturation and unsaturation on alternate half cycles. A plurality of signal responsive devices are inductively coupled to the core member and are each adapted to reset the core member from a condition of saturation. The signal responsive devices are such that the one having the largest input signal applied thereto will fire first to reset the core member in an amount proportional to the amplitude of this largest input signal. When this first device fires, it prevents all of the other signal responsive devices from affecting the flux density of the core member. On the next half cycle, then, the time required for the core member to saturate is a function of the average amplitude of the aforesaid largest input signal and the voltage appearing across the core member during this half cycle will be directly proportional to the average voltage amplitude of the aforesaid largest input signal.

It is a further object of this invention to provide a novel amplitude discriminator circuit which is characterized in that out of a plurality of input signals an output signal is derived having an average voltage value proportional to the average voltage amplitude of the smallest input signal.

The above and other objects of the invention will become apparent from the following detailed description taken in connection with the accompanying drawings which form a part of this specification and in which.

Figure 1:
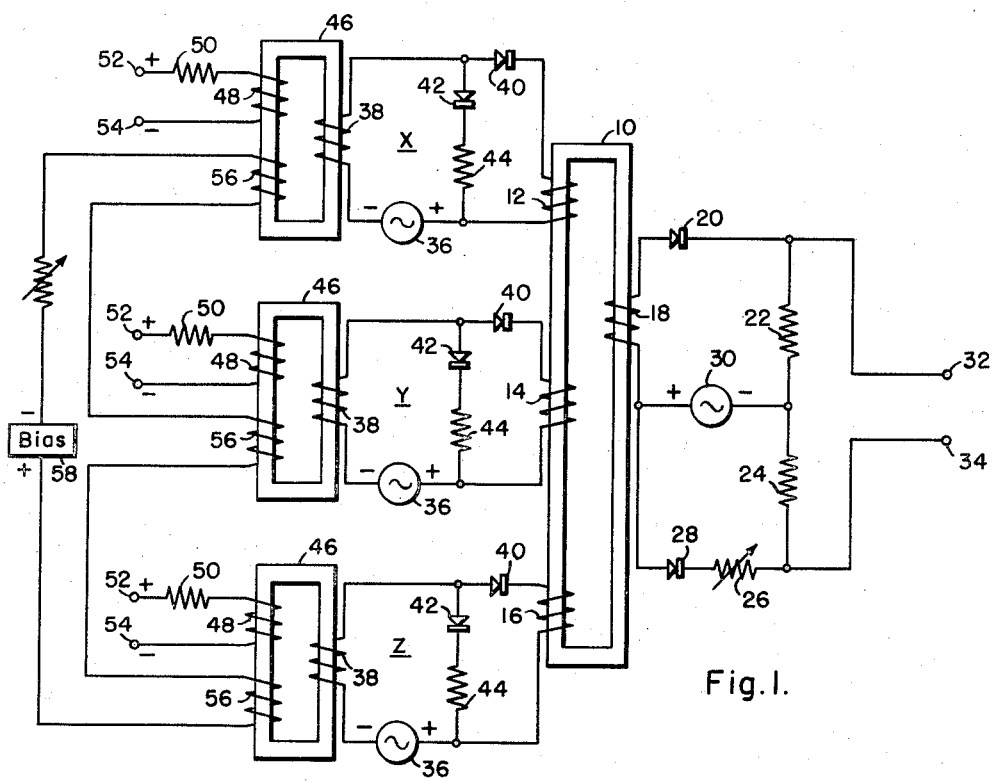
Figure 1 is a schematic circuit diagram illustrating the invention.

Referring to Fig. 1, the circuit shown comprises a saturable magnetic core member 10 having four windings 12, 14, 16 and 18 inductively coupled thereto. Between the opposite terminals of winding 18 is the series combination of rectifier 20, resistors 22 and 24, variable resistor 26, and rectifier 28. A source of alternating current voltage 30 is connected between one terminal of winding 18, as shown, and the junction of resistors 22 and 24. It should be apparent that the arrangement just described comprises a bridge circuit. Assuming that winding 18 is short-circuited, rectifiers 20 and 28 will conduct when the polarity of the output of source 30 is as shown to develop equal, opposing voltages across resistors 22 and 24. Thus, the output voltage across the terminals 32 and 34 will be zero. If the short-circuit is removed from winding 18 and a voltage is induced across the winding, the bridge will become unbalanced (i. e., the voltage across resistor 22 will be less than that across resistor 24); and an output voltage will be developed across terminals 32 and 34 which is proportional to the voltage induced across winding 18.

Connected between the oposite terminals of windings 12, 14 and 16 are magnetic amplifier control devices X, Y and Z, respectively. Although only three of these devices are shown in the present embodiment, their number may be extended to any desired number. Since all of the control devices are similar in construction in the present embodiment, they will be described together. In series with each of windings 12, 14 and 16 are a source of alternating current voltage 36, a winding 38 and a rectifier 40. Voltage sources 36 are all in phase with source 30, but they have their polarities reversed with respect to source 30 so that rectifiers 40 will conduct on one half cycle when the polarity of the output of sources 36 is opposite to that shown, whereas rectifiers 20 and 28 will conduct on the other half cycle. In parallel with each of windings 12, 14 and 16 and its associated rectifier 40 is a rectifier 42 and a resistor 44.

A saturable magnetic core member 46 is inductively coupled to each of the windings 38. A second winding 48, inductively associated with each core member, is connected through resistor 50 to a pair of input terminals 52 and 54. Separate input signals may be applied to each set of input terminals 52, 54. Bias windings 56 are inductively coupled to the cores 46 on each control device, as shown. The windings 56 are connected in series between the opposite terminals of a direct current voltage source 58. All of the windings shown are wound in the same manner to induce flux in core 46 in the same direction when voltages of like polarity are applied across their terminals.

Figure 2:
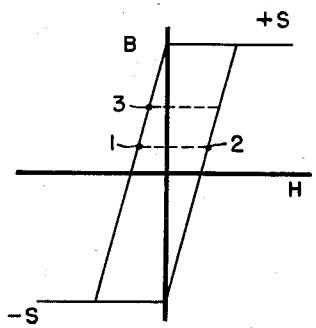
Fig. 2 illustrates the hysteresis curve of the magnetic core material employed in the various saturable transformers of the invention.

Operation of the circuit shown in Fig. 1 may best be understood by reference to Fig. 2, where the rectangular hysteresis curve for the type of magnetic material used in cores 10 and 46 is illustrated. In accordance with well known magnetic theory, the quantity H represents field intensity at any instant and is measured in ampere turns per unit of length. The quantity B represents flux density at any instant and is measured in webers per square unit of area. It can be seen that the core material presents a sharp cutoff point between conditions of saturation (i. e., constant B as H increases) and unsaturation. When a reactor is saturated it will, of course, present a much lower impedance than when unsaturated. The reactor will saturate in the +S or −S region as shown in the drawing, depending upon the polarity of the voltage applied thereto. Thus, it will saturate in the +S region when a positive voltage is applied; whereas it will saturate in the −S region when a negative voltage is applied. Whether or not the reactor will saturate depends upon the magnitude of the voltage applied thereto and the time duration of that voltage. This is in accordance with the well known induced voltage equation for an inductor which is:

$$\Delta B = \frac{k}{NA} \int_0^t e\, dt$$

where $k$ = a constant
$\Delta B$ = change of flux density
$N$ = number of turns of wire in the winding of the inductor
$A$ = cross-sectional area of the core of the inductor
$e$ = instantaneous voltage, and
$t$ = time in seconds.

It can be seen that the change in flux density depends upon the factor $$\int_0^t e\,dt$$

measured in volt seconds. In other words, the change in flux density depends upon the applied voltage and the time duration of that voltage. It is, consequently, possible to achieve a particular change in flux density B with many different voltage levels by varying the time duration of different voltage levels so that the factor $$\int_0^t e\,dt$$

is always the same. It, of course, follows that it is possible to reach the saturation level of flux density with many different variations of the factor $$\int_0^t e\,dt$$

On one half cycle of the voltage source 30 when the polarities of sources 30 and 36 are as shown, rectifiers 20 and 28 will conduct and core 10 will be driven to saturation. During the time that core 10 is changing flux, the voltage appearing across windings 12, 14 and 16 is equal and opposite to the voltage of sources 36. When the core 10 saturates the voltage across windings 12, 14, 16 and 18 drops to substantially zero. During this half cycle rectifiers 40 will block voltage sources 36. On the next half cycle rectifiers 20 and 28 will block voltage source 30 and rectifiers 40 will now conduct. Windings 12, 14 and 16 are designed to have a much lower impedance than windings 38. Therefore, during the initial part of the half cycle during which rectifiers 40 conduct, very little voltage will appear across windings 12, 14 and 16; and substantially all of the voltage from sources 36 will appear across windings 38. Windings 56 are used to reset cores 46 from a condition of saturation. Referring again to Fig. 2, if cores 46 becomes saturated in the +S region on the half cycle that rectifiers 40 conduct, the bias voltage applied to windings 56 will reset the flux density B at some point 1 on the hysteresis curve during the next half cycle because the polarity of the direct current voltage applied across windings 56 is reversed with respect to the voltage applied across windings 38 on the half cycle that rectifiers 40 are conducting. When rectifiers 40 conduct, the flux density will be forced from point 2 on the other side of the hysteresis curve to saturation in the +S region.

The polarity of the control voltages applied to windings 48 is reversed with respect to that applied to windings 56. The control signals may be either direct or alternating current voltages, but if an alternating current signal is used it must have a polarity reversed with respect to that across winding 56 when core 46 is being reset. Thus, these two voltages will oppose each other. In the actual reset process, therefore, the flux density will not go to point 1 on the hysteresis curve when a control voltage is applied to winding 48, but will go to some point 3 determined by the average magnitude of the voltage applied to terminals 52 and 54. The time required for the core 46 to saturate will depend upon the location of point 3 on the hysteresis curve. As the average magnitude of the control voltage is increased, point 3 will advance towards +S saturation. Consequently, the core 46 will saturate first which has the largest control signal applied thereto.

Assuming that core 46 in magnetic amplifier device X saturates first, the impedance of winding 38 of device X will drop to substantially zero and substantially all of the voltage from source 36 will appear across winding 12. This voltage appearing across winding 12 will reset or drive core 10 from the condition of saturation effected on the preceding half cycle when rectifiers 20 and 28 were conducting. When the core 10 is driven from saturation the voltage from source 36 in device X will appear across all of windings 14, 16 and 18 due to transformer action. The voltage across windings 14 and 16 in devices Y and Z will oppose the voltage from source 36 in these respective devices. Consequently, the magnetic amplifier devices Y and Z cannot affect the flux in core 10 once the core 46 has saturated in device X. In other words, when one of the magnetic amplifier control devices fires to reset core 10, it effectively blocks all of the other devices.

The induced voltages across windings 14 and 16, when device X fires, will be opposite and substantially equal to the output voltage of sources 36 in devices Y and Z. If rectifier 42 and resistor 44 were absent, the induced voltages across windings 14 and 16, when device X fires, would immediately cause the termination of the flux excursion toward positive saturation in cores 46 in devices X and Y. In addition, the joint action of the bias voltage from source 58 and the control voltages applied to terminals 52 and 54 would cause cores 46 to reset before the flux level had reached saturation in the cores 46 in the devices Y and Z, and before the reset half cycle of voltage sources 36 began. This would result in a reset level of these cores below point 3 as shown in Fig. 2. Rectifiers 42 and resistors 44 provide an alternate path for currents from sources 36 through windings 38 while rectifier 40 blocks voltages induced on windings 14 and 16 to prevent this undesirable coupling effect between the magnetic amplifier devices by allowing all of the cores 46 to reach saturation before their reset half cycle begins regardless of which of the cores 46 saturates first.

The degree of flux excursion in the reset of core 10 after device X fires is dependent upon the time duration of the voltage source 36 appearing across winding 12 in accordance with the explanation given above. This, in turn, is dependent upon the magnitude of the control voltage applied to terminals 52 and 54 of device X. As the magnitude of the control voltage increases, point 3 on the hysteresis curve of core 46 will approach saturation. Consequently, when rectifier 40 conducts, the time required for the core 46 to saturate decreases as the magnitude of the control voltage increases. It should now be apparent that as the magnitude of the control voltage applied to terminals 52 and 54 increases with a resultant increase in the flux excursion on the reset half cycle of core 10, the average voltage appearing across terminals 32 and 34 will also increase. Thus, since the magnetic amplifier device which has the largest control voltage applied thereto will fire first and block all the other magnetic amplifier devices, the average output voltage appearing across terminals 32 and 34 will be proportional to this largest signal.

With slight modification the circuit shown in Fig. 2 can be made to produce an average output voltage which is proportional to the smallest average amplitude of a plurality of input signals rather than the amplitude of the largest input signal. This can be effected by eliminating the windings 56 and voltage source 58 and reversing the polarity of the control signals applied to windings 48 to reset core members 46. In addition, resistors 24 and 26, and rectifier 28 will be eliminated and terminal 34 will be connected to the junction of source 30 and resistor 22. With this arrangement, the flux excursion away from saturation on the reset half cycle of cores 46 will increase as the magnitude of the input signal increases. Consequently, the core 46 in the magamp device having the smallest signal applied thereto will saturate first and will control reset of core 10. The degree of flux excursion in the reset of core 10 will therefore increase as the amplitude of the smallest input signal decreases and an output voltage will appear across resistor 22 having an average value proportional to the smallest input signal.

Although the invention has been described in connection with a certain specific embodiment, it should be readily apparent to those skilled in the art that various changes in form and arrangement of parts can be made to suit requirements without departing from the spirit and scope of the invention. In this respect it should be apparent that it will be possible by slight modification to compare the percentage values of input signals having widely different absolute values. For example, it may be desired to compare the ratio of the actual value of a signal A to its maximum value of 10 volts with the ratio of the actual value of a signal B to its maximum value of 100 volts. Under these conditions the control devices could be altered so that the amount of flux reset which occurs in member 10 for an amplitude of, say, 8 volts on signal A would be identical with that occurring for an amplitude of 80 volts on signal B.

We claim as our invention:

1. Apparatus for obtaining an output voltage proportional to the amplitude of one of a plurality of input signals and comprising a saturable inductive core member, a plurality of devices for inducing flux change in said core member, with each of said devices including first winding means inductively associated with said core member, a source of alternating current voltage and second winding means connecting in series relationship with said first winding means in each of said devices, a saturable inductive core member inductively associated with said second winding means in each of said devices, means responsive to an input signal for inducing flux change in said latter-mentioned core member of each said devices, and output voltage deriving means for deriving said output voltage from said apparatus including output winding means inductively associated with said first-mentioned core member and including at least one unidirectionally conductive device serially connected to at least one output impedance element and connecting the opposite terminals of said output winding means, and a source of alternating current voltage connected between one of said terminals and said output impedance element.

2. Apparatus for obtaining an output voltage proportional to the amplitude of one of a plurality of input signals and comprising a saturable inductive core member, a plurality of devices for inducing flux change in said core member, each of said devices including first winding means inductively associated with said core member, the combination of second winding means, a source of alternating current voltage and second winding means all connected in series with the first winding means in each of said devices, a saturable inductive core member inductively associated with said second winding means in each of said devices, means responsive to an input signal for inducing flux change in said latter-mentioned core member of each of said devices, and means for deriving said output voltage from said apparatus including output winding means inductively associated with said first-mentioned core member, a source of alternating current voltage in phase with said first-mentioned voltage sources, a connection between one terminal of said latter-mentioned voltage source and one end of said output winding means, a first unidirectional current device and a first impedance element in series connecting the other end of said output winding means with the other terminal of said latter-mentioned voltage source, and a second unidirectional current device and a second impedance element in series connecting said one end of the output winding means with said other terminal.

3. Apparatus for obtaining an output voltage proportional to the amplitude of one of a plurality of input signals and comprising a saturable inductive core member, core saturation means including a source of alternating current voltage for driving said core member to saturation on one half cycle of said alternating current voltage source, a plurality of devices inductively linked to said core member for resetting said core member to a condition of unsaturation on the other half cycle of said voltage source, with each of said devices including an element of saturable magnetic material, flux inducing means responsive to an input signal for inducing flux in said element in one direction, and means for driving said element to saturation on the other half cycle of said alternating current source.

4. Apparatus for obtaining an output voltage proportional to the amplitude of one of a plurality of input signals and comprising a saturable inductive core member, core member saturation means including a source of alternating current voltage for driving said core member to saturation on one half cycle of said alternating current source, a plurality of devices inductively associated with said core member for resetting said core member to a condition of unsaturation on the other half cycle of said voltage source, each of said devices including an element of saturable magnetic material, a source of alternating current voltage in phase with said first voltage source for driving said element to saturation on the other half cycle of said voltage sources, and reset means responsive to an input signal for resetting said element on said one half cycle of said voltage sources.

5. Apparatus for obtaining an output voltage proportional to the largest amplitude of a plurality of input signals and comprising a saturable inductive core member, core member saturation means including a source of alternating current voltage for driving said core member to saturation on one half cycle of said alternating current source, a plurality of devices inductively coupled to said core member for resetting said core member to a condition of unsaturation, each of said devices including an element of saturable magnetic material, saturation means for driving said element to saturation in one direction on the other half cycle of said voltage source, reset means associated with the magnetic element in each of said devices for resetting said elements on said one half cycle by a predetermined amount, and input signal responsive means associated with each of said elements and responsive to an input signal for opposing the resetting action of said reset means by an amount proportional to the amplitude of said input signal.

6. Apparatus for obtaining an output voltage proportional to the amplitude of one of a plurality of input signals and comprising a saturable inductive core member, saturation means including a source of alternating current voltage for driving said core member to saturation on one half cycle of said alternating current source, a plurality of devices inductively coupled to said core member and adapted for resetting said core member to a condition of unsaturation on the other half cycle of said voltage source, signal applying means for applying a control signal to each of said devices whereby the time required for any one of said devices to effect reset will be a function of the voltage amplitude of an input signal applied thereto, and control means included in each of said devices to prevent it from effecting a flux change in said core member after one of the other of said devices has caused the core member to reset.

7. Apparatus for obtaining an output voltage proportional to the amplitude of one of a plurality of input signals and comprising a saturable inductive core member, means including a source of alternating current voltage for driving said core member to saturation on one half cycle of said alternating current source, a plurality of devices each inductively coupled to said core member, each of said devices being adapted to reset said core member from a condition of saturation on the other half cycle of said voltage source, said devices being characterized by a reset time which is a function of the voltage amplitude of an input signal applied thereto, and flux change control means included in each of said devices for preventing it from effecting a flux change in said core member after one of said devices has caused the core member to reset.

8. Apparatus for obtaining an output voltage proportional to the amplitude of one of a plurality of input signals and comprising a saturable inductive core member, saturation means including a source of alternating current voltage for driving said core member to saturation on one half cycle of said alternating current source, and a like plurality of devices each inductively coupled to said core member and adapted to reset said core member from a condition of saturation on the other half cycle of said voltage source, with each of said devices being characterized by a reset time which is a function of the voltage amplitude of the particular input signal applied thereto.

9. Apparatus for obtaining an output voltage proportional to the amplitude of one of a plurality of input signals and comprising a saturable inductive core member, saturation means including a source of alternating current voltage for driving said core member to saturation on one half cycle of said alternating current source, and a plurality of devices each responsive to a different one of said input signals and being inductively coupled to said core member and adapted to reset said core member from a condition of saturation on the other half cycle of said voltage source.

10. Apparatus for obtaining an output voltage proportional to the amplitude of one of a plurality of input signals and comprising a saturable inductive core member, saturation means for periodically driving said core member to saturation, a plurality of devices each inductively coupled to said core member and adapted to reset the core member to a condition of unsaturation, between periods during which the core member is driven to saturation, each of said devices being responsive to a different input signal for resetting said core member to a condition of unsaturation over a time interval which is a function of the voltage amplitude of the signal applied thereto.

References Cited in the file of this patent

UNITED STATES PATENTS

| | | |
|---|---|---|
| 2,637,018 | Hertoz | Apr. 28, 1953 |
| 2,653,254 | Spitzer et al. | Sept. 22, 1953 |
| 2,725,549 | Dunnet | Nov. 29, 1955 |